Oct. 30, 1945.  F. M. M. B. SALOMON  2,387,776
OSCILLATION REDUCING DEVICE

Filed May 14, 1940  6 Sheets-Sheet 1

INVENTOR
Francois Marie Michel Lernard Salomon
BY
F. Bascom Smith
ATTORNEY Oct. 30, 1945. F. M. M. B. SALOMON 2,387,776
OSCILLATION REDUCING DEVICE
Filed May 14, 1940 6 Sheets-Sheet 2

Oct. 30, 1945.   F. M. M. B. SALOMON   2,387,776
OSCILLATION REDUCING DEVICE
Filed May 14, 1940   6 Sheets-Sheet 3

INVENTOR
François Marie Michel
Bernard Salomon
BY
F. Bascom Smith
ATTORNEY

Oct. 30, 1945.  F. M. M. B. SALOMON  2,387,776
OSCILLATION REDUCING DEVICE
Filed May 14, 1940   6 Sheets-Sheet 4

INVENTOR
Francois Marie Michel Bernard Salomon
BY
F. Bascom Smith
ATTORNEY

Oct. 30, 1945.  F. M. M. B. SALOMON  2,387,776
OSCILLATION REDUCING DEVICE
Filed May 14, 1940   6 Sheets-Sheet 5

INVENTOR
François Marie Michel Bernard Salomon
BY
F. Bascom Smith
ATTORNEY

Oct. 30, 1945. F. M. M. B. SALOMON 2,387,776
OSCILLATION REDUCING DEVICE
Filed May 14, 1940 6 Sheets-Sheet 6

INVENTOR
Francois Marie Michel Bernard Salomon
BY
F. Bascom Smith
ATTORNEY

Patented Oct. 30, 1945

2,387,776

UNITED STATES PATENT OFFICE 2,387,776

OSCILLATION REDUCING DEVICE

François Marie Michel Bernard Salomon, Paris, France; vested in the Alien Property Custodian Application May 14, 1940, Serial No. 335,081
In Luxemburg, May 19, 1939

18 Claims. (Cl. 74—574)

This invention relates to devices for reducing speed oscillations, in general, vibrations and jerks in the members of any structures, but more particularly in machine shafts.

It is applicable to the damping of torsional, flectional, lateral and like oscillations.

The devices, according to the present invention, can be placed in any part of the machines, and, namely, on the machine shafts. For instance, the same may be placed at the front or at the rear of the crankshafts, in the crankshafts, in engine balance-weights, on ventilators or ventilator pulleys, in the arrangements of connecting rods, in propeller hubs, on aero shafts, on marine shafts and the like.

The devices, according to the present invention are absolutely different from the centrifugal pendulums heretofore used as vibration dampers.

Indeed, in the centrifugal pendular systems the auxiliary centrifugal masses are submitted to the restoring force of the centrifugal forces acting on themselves.

On the contrary, a device, according to the present invention, comprises at least one member which is rotatively carried with a shaft and which rocks or oscillates under the action of the disturbances. Said member is restored to its mean position by at least one centrifugal restoring member carried by said oscillating member and operatively connected with a part which is rotatively movable with or, more particularly, integral with the shaft. The reaction of said part is the force which produces the restoring force.

In devices comprehended by the present invention the force which restores the oscillating member to its mean position is due entirely, or almost entirely, to the restoring forces resulting from the action exerted by the restoring member carried by the oscillating member, whereas, in the case of centrifugal pendulums, the restoring force is due to the action of the centrifugal forces acting on the oscillating masses themselves.

The centrifugal restoring member acts more particularly as a restoring lever, the axis of which is carried by the oscillating member, and restores the latter to its mean position by being operatively connected with a member integral with the rotary shaft. In general the restoring member is effectively a lever, but the same can also act differently. The oscillating member can be centered or not on the axis of the shaft which creates the centrifugal forces and which may or may not be the shaft that is subjected to the disturbances. The oscillating member may be in the form of a plate, a disc, or a fraction of a disc or a flywheel. In a general way it may be called a "harmonic disc," even if properly speaking it is not in the shape of a disc. As has already been seen, its working is entirely different from the working of centrifugal pendulums.

It has been known for at least twenty-five years that, in any device intended for regularizing the torques, it may be advantageous to realize, more or less exactly, certain "tuning" conditions between the frequency of the disturbances and the natural frequency of the oscillating masses.

It is quite obvious that the advantage of this "tuning" also exists, in general, for the devices embodying the present invention. The natural frequency of the oscillating weight member in said devices is the one which results from the action of the restoring member in determined conditions.

The connection between the restoring member and the corresponding oscillating member can be of any nature, such as cylindrical or spheric articulations, cams, balls, or rollers.

According to the present invention, the oscillating member preferably rocks or oscillates with little or very little friction; preferably, also, the restoring effects are substantially due solely to the action of the centrifugal forces, without elastic means.

However, it is within the scope of the present invention to employ frictional or elastic means, fluid means and the like, either for the restoring of the oscillating mass or for any other reason.

The advantages of the devices which the invention has for its object relative to known devices and especially to dampers utilizing centrifugal pendulums are very considerable for many different reasons. Those advantages may be substantially summed up as follows:

(a) They can be very easily adapted to the elimination of the lowest and highest harmonics.

(b) They are more efficient than the known dampers, especially those with centrifugal pendulums, under given conditions and for a given weight for the oscillating members.

(c) They make possible the utilization of the available space to the best advantage in the most simple manner.

(d) The conditions of resonance depend upon numerous and very different factors, which gives great facilities.

(e) For given conditions they are efficient at rotation speeds which are much lower than the lowest speeds at which known dampers are efficient.

(f) They avoid the use of noisy abutments and their working is always absolutely noiseless.

(g) They are of a very simple construction and of a very low cost.

(h) They afford in a very simple and efficient manner the elimination of two or several harmonics simultaneously with only one oscillating member.

Certain constructions embodying the present invention are diagrammatically illustrated, by way of example, in the accompanying drawings, of which.

Figure 1:
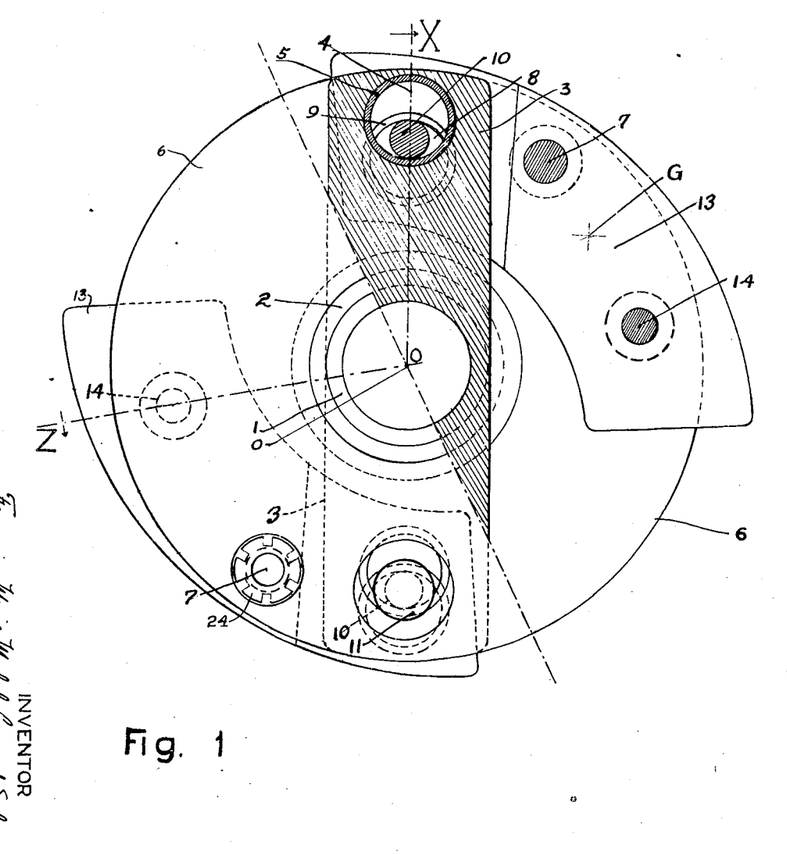
Fig. 1 is a side view, partly in section, illustrating an embodiment of the present invention of the type wherein the oscillating member is concentric with the shaft, the section being taken in the plane of line E—F of Fig. 2.
Figure 2:
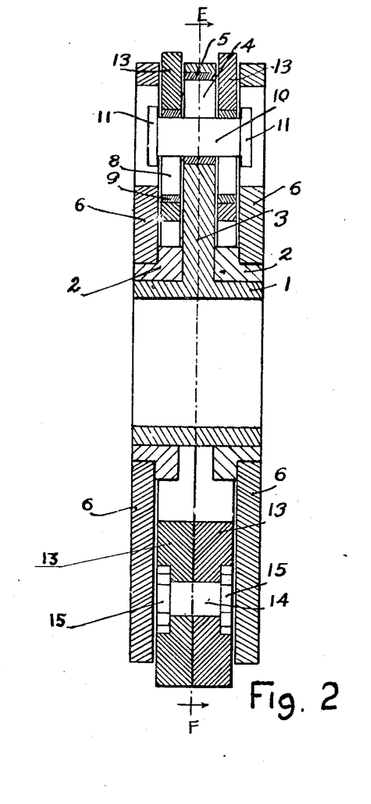
Fig. 2 is a section taken substantially on line X—Z of Fig. 1.

Referring to the embodiment of the invention illustrated in Figs. 1 and 2, an oscillating member constituted by two circular discs 6 held in spaced relation by means of members 7 (Figs. 1 and 4) is mounted for rotation on a pair of rings 2 that are L shaped in cross-section and are formed of steel, cast iron, bronze, or any other metal. Said rings are centered on the shaft 1 or a sleeve secured to a shaft for rotation therewith and, if desired, could be replaced by any known type of bearing such as ball, roller, needle, and the like.

The mass 6, 6 carries the axes or pivots 7 upon which the arcuate masses 13 are mounted. The masses 13 act as centrifugal restoring levers for restoring the mass 6, 6 to its mean position when it moves away to the right or to the left under the action of the disturbances.

In order to obtain said restoring action, the free ends of levers 13 rest upon and are operatively connected with the web 3 which is integral with shaft 1. As viewed in Fig. 1, web 3 has a substantially rectangular shape but it may have any other shape. The upper half of web 3 is shown in section in Fig. 2 wherein the outer edge of each end thereof has the same radius of curvature as discs 6.

This web is provided with diametrically disposed cylindrical recesses 4 fitted with rings 5 and the restoring levers 13 are provided with corresponding cylindrical recesses 8 fitted with rings 9. Some or all of the rings 5 and 9 are preferably loose in their housings.

The two restoring devices for the rocking mass 6, 6 (rocking disc) are symmetrical relative to the axis O and it is accordingly sufficient to describe one of them (top of Fig. 2).

A roller 10 having cheeks 11 at the ends thereof extends through ring 5 and rings 9, 9 and acts as an intermediate member between the web 3 and the restoring lever 13. This roller is capable of double rolling motion without sliding, or without substantial sliding motion on said rings.

Each of the levers 13 comprises two cheeks or plates (Fig. 2) which are connected by a bolt 14 and nuts 15, 15. Said levers are bifurcated at one end for straddling web 3.

The working is as follows: Under the action of the disturbances the discs 6 rock about a mean position and the restoring levers 13 act to restore the same to said mean position.

If, for instance, the lever 13 at the top in Figs. 1 and 2 is considered, the resultant of the centrifugal forces created by the rotation of the shaft acts on the center of gravity G of said lever and is always tending to make said lever turn around its axis 7 in a counterclockwise direction.

Consequently, the lever 13 through its rings 9 rests on the roller 10, and through this intermediary, rests on the ring 5 in the recess 4 of web 3 so that it always tends to restore the mass 6 to its mean position.

Of course, the working is the same for the symmetrically disposed restoring system on the other side of shaft 1. The restoring actions of the two symmetrically disposed systems are added while the radial components of the restoring efforts of the two systems are opposite and equal. The result is that the pressure of the disc 6 on its center bearings 2 is very small.

Figure 3:
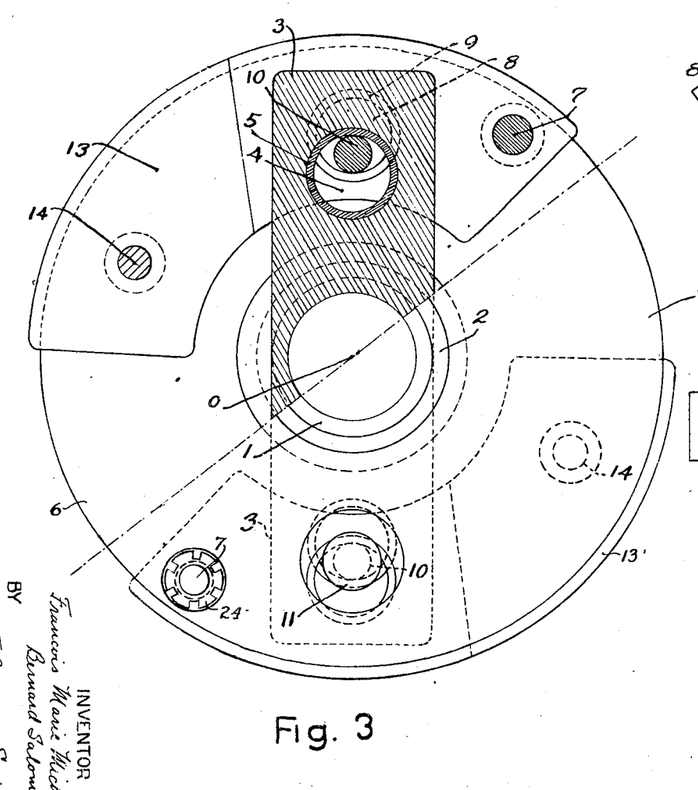
Fig. 3 is a side elevation, partly in section, of a second embodiment of the invention similar to that shown in Fig. 1 but differing therefrom in the pivotal mounting of the centrifugal levers.

The device represented in Fig. 3 differs from the previous one (Figs. 1 and 2) in that the restoring lever acts on the rocking mass (disc 6) by traction on the disc instead of acting on said mass by pushing, as in the device of Figs. 1 and 2.

This inversion of the action of the restoring levers is achieved by inverting the disposition of the center of gravity G and pivot 7 of the restoring lever with respect to the roller 10 so that the centrifugal forces tend to make lever 13 (Fig. 3) turn around its axis 7 in a clockwise direction.

A view of the device of Fig. 3 corresponding to Fig. 2 of the first embodiment is not shown for the reason that Fig. 2 is sufficient to make the structure of the device of Fig. 3 understood. The latter device is quite similar to the device illustrated in Figs. 1 and 2.

Figure 4:
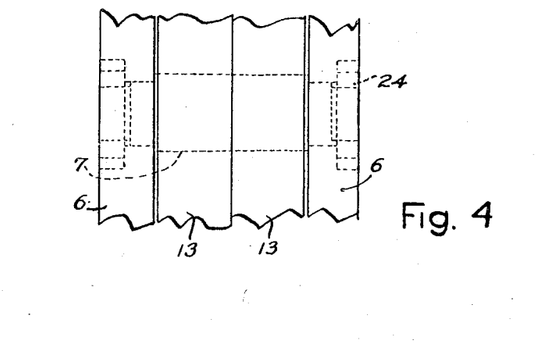
Fig. 4 is an enlarged detail view, with parts broken away, illustrating the pivot for the centrifugal members or levers.

Fig. 4 shows in detail the axis 7 of a restoring lever 13. This axis can be seen to be carried by the two cheeks 6 and fixed by nuts 24.

Figures 5, 6:
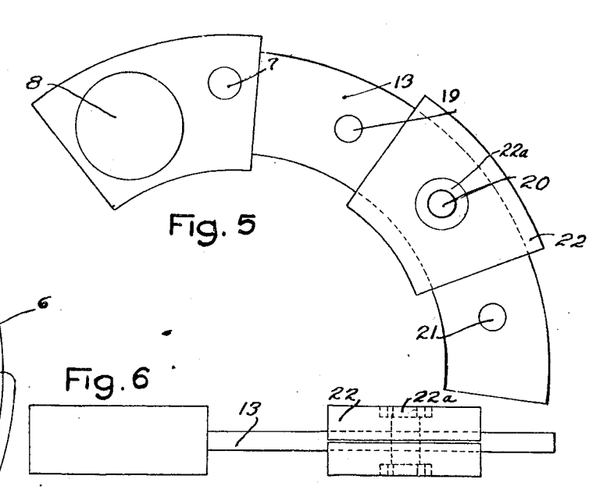
Fig. 5 is a side view of a centrifugal member or lever provided with means for adjusting its center of gravity.
Fig. 6 is a top plan view of the parts shown in Fig. 5.

In all cases and for any arrangements—if it refers to the ones already described or to the ones which will be described further on—it may be advantageous to gradually regulate the restoring action of the levers 13. This can be achieved by displacing the center of gravity, for instance by moving a slide which can be fixed at will on any part of the lever. Figs. 5 and 6 show the slide 22 which can be fixed through the intermediary of a bolt 22a at any number of points 19, 20, 21, etc., only three of such points having been represented. The position of the center of gravity could also be changed by any other means.

Figure 7:
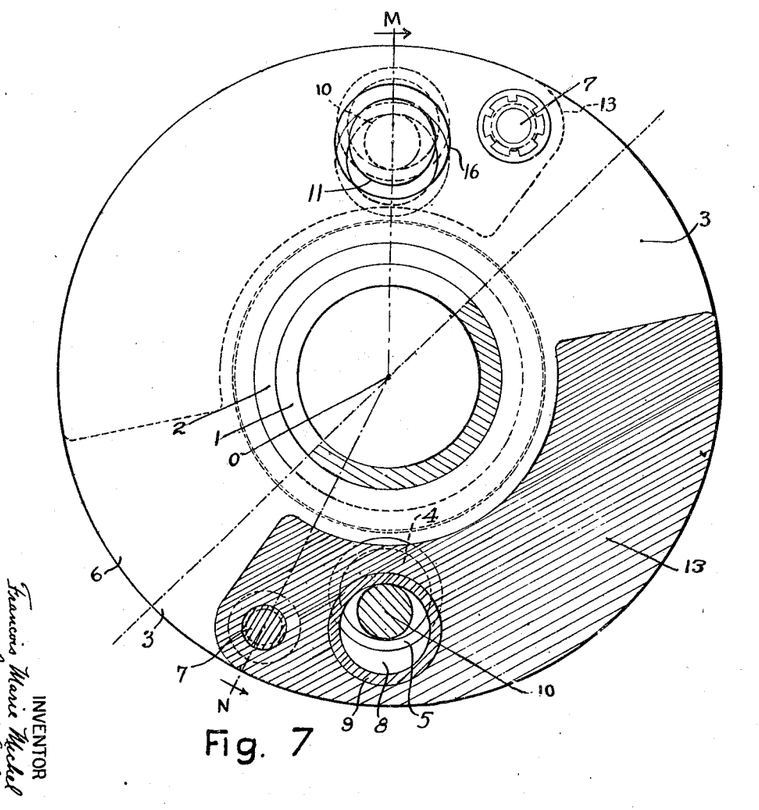
Fig. 7 is a side view, partly in section, of another embodiment of the invention, the section being taken in the plane of line P—Q of Fig. 8.
Figure 8:
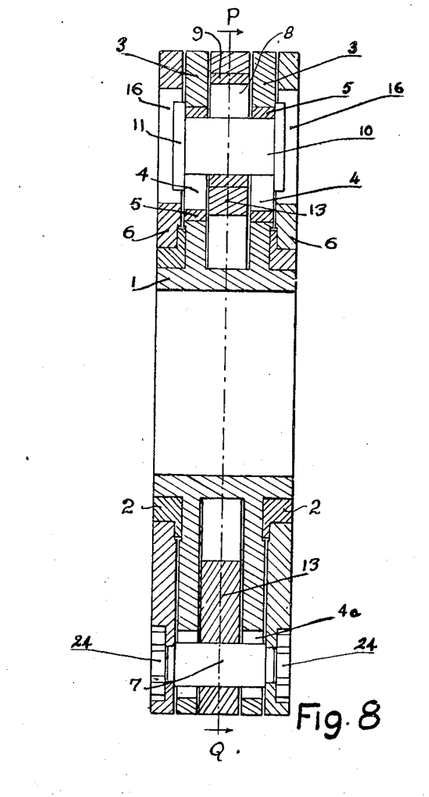
Fig. 8 is a sectional view of the structure shown in Fig. 7, the section being taken through one roller and one pivot member substantially on line M—N of Fig. 7.
Figures 9, 10:
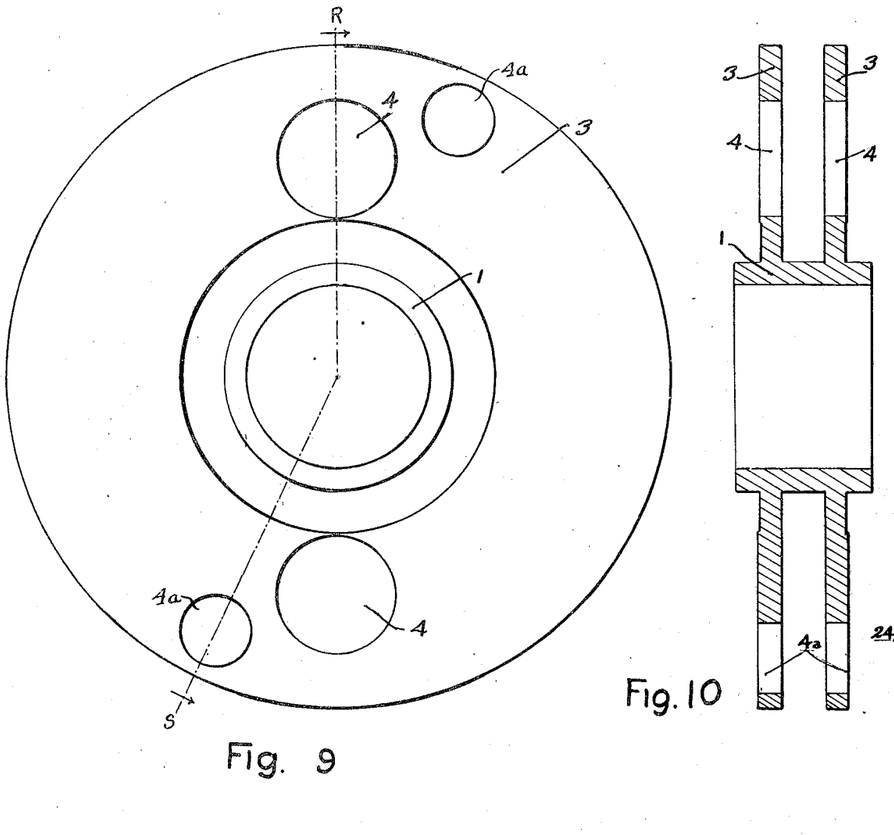
Fig. 9 is a side elevation of the means operatively connecting the centrifugal members and oscillating members of Figs. 7 and 8 to the shaft.
Fig. 10 is a sectional view taken on line R—S of Fig. 9.
Figure 11:
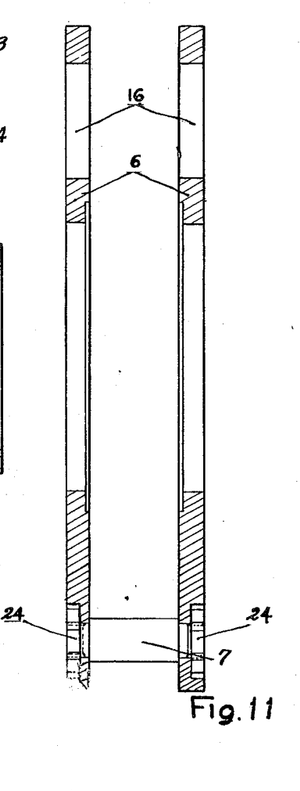
Fig. 11 is a detailed view of the oscillating members in section as shown in Fig. 8.

The principles are quite similar regarding the device represented in Figs. 7 and 8, of which the main parts are shown in Figs. 9, 10 and 11.

The rocking mass 6 constituted by two cylindrical cheeks, as described above, also carries the axes 7 for the restoring levers 13. The web 3 is constituted by two circular axially spaced plates integral with the shaft 1 and provided with holes 4a through which the axes 7 extend. As shown in Fig. 10, the two plates of web 3 are integral with the shaft 1.

Fig. 11 shows the rocking mass 6 which is constituted by two plates connected by stays. The axes 7 for the restoring levers 13 act as said stays.

Figure 12:
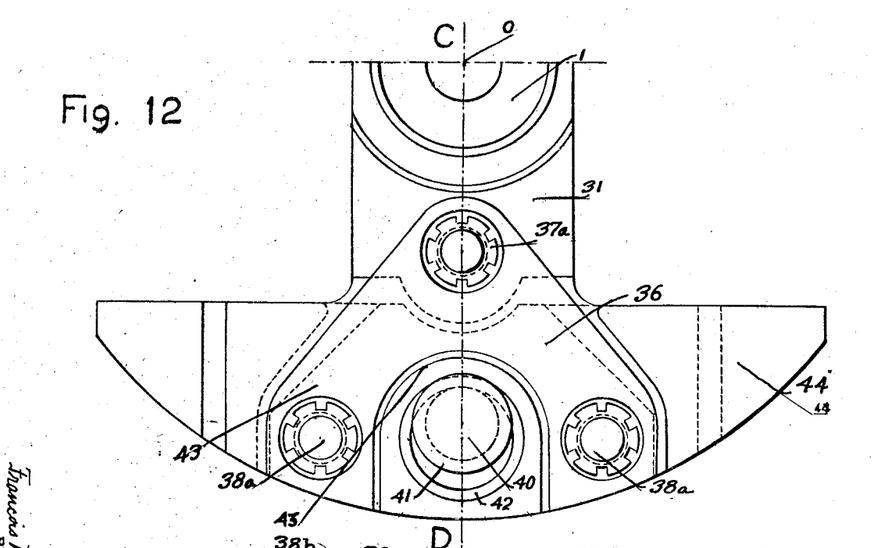
Fig. 12 is a side elevation of an embodiment of the invention wherein the oscillating member is eccentric with respect to the axis of the shaft.

Fig. 12 illustrates a device according to my invention mounted on the balance-weight of a machine shaft. Said machine could be, namely, an engine for any application, such as a radial or in-line engine.

In the embodiment of Figs. 12 to 18, inclusive, the shaft 1, whereof the axis is O, is integral with a web or arm 31 in which are bored two recesses 32 and 33 (Fig. 15) fitted with rings 34 and 35 that are preferably made of tempered, cemented steel. Also, the ring 34 is preferably forced into the web 31. The ring 35 can be loose.

Figure 15:
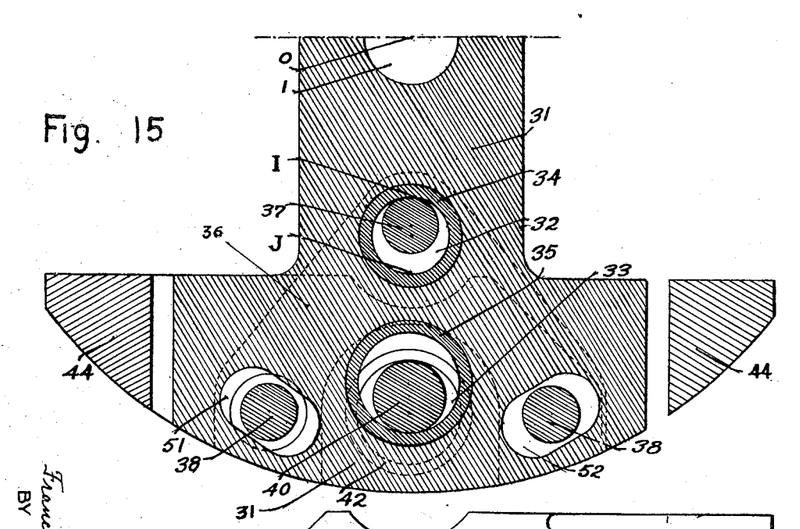
Fig. 15 is a sectional view taken substantially on line A—B of Figs. 13 and 14.
Figure 16:
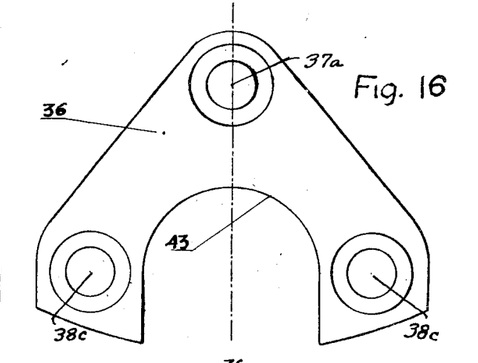
Fig. 16 is a side elevation of the oscillating member shown in Figs. 12 to 15, inclusive.
Figure 17:
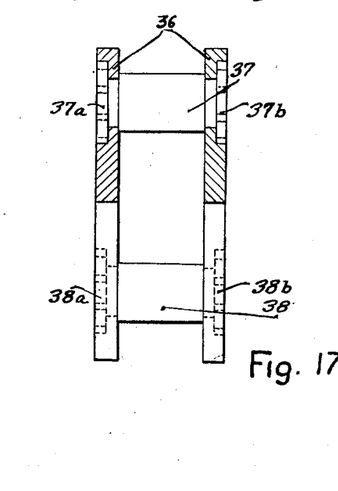
Fig. 17 is a sectional view taken on line T—U of Fig. 16.
Figure 18:
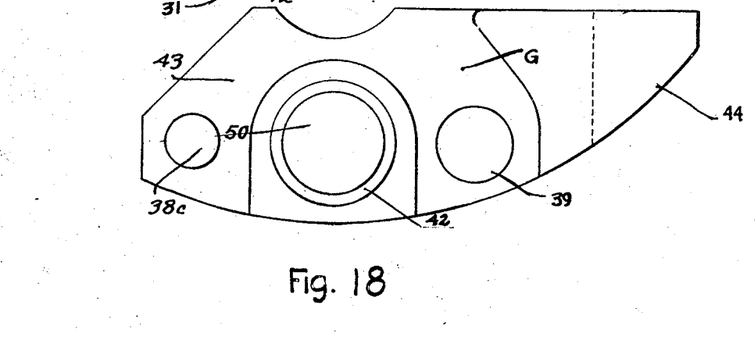
Fig. 18 is a side elevation of one of the centrifugal members shown in Figs. 12 to 15, inclusive.

The oscillating member 36 is carried, as in previous devices, by restoring levers which restore it to its mean position when it moves away to the right or to the left under the action of disturbances. Said rocking mass 36 is constituted by two plates shown in Figs. 16 and 17 and connected by three stays forced into the plates, and even eventually keyed on them, and consequently unable to turn relatively to them. One of those stays is constituted by the cylinder 37 (Fig. 17) and the other two by the cylinders 38 (Figs. 15 and 17). The nuts 37a, 37b, 38a and 38b complete the arrangement (Fig. 17).

The cylinder 37 (Fig. 17) extends through the recess 32 of the web 31 (Figs. 14 and 15) and is constantly lifted up by the restoring levers toward the axis O and under those conditions it constantly bears against the generatrix I of the ring 34 (Fig. 15). The two other stays 38 act as axes for the restoring levers 43 which are visible in Figs. 12 to 15, inclusive. One of said levers is shown separately in Fig. 18.

Figure 13:
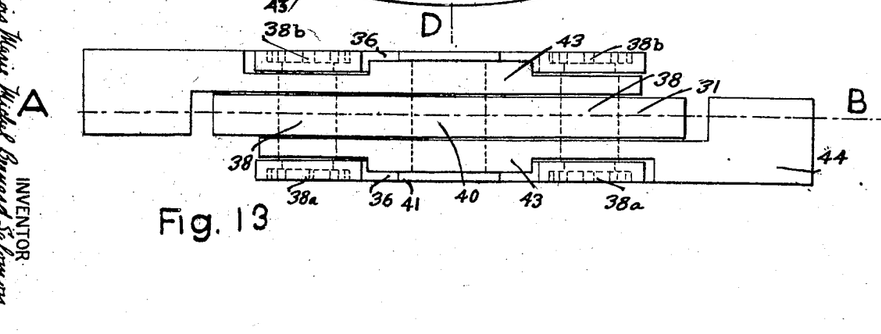
Fig. 13 is a bottom view of the device illustrated in Fig. 12.

Each of the restoring levers 43 (Fig. 18) is constituted by a long plate having one extremity 44 thicker, as can be seen in Fig. 13. This increased thickness at the extremity tends to increase the distance between the center of gravity of the lever and its axis 38 carried by the oscillating member 36. This axis is constituted by one of the stays 38 (Figs. 13 and 17) and to insure the centering of the lever 43 on said axis, said lever is provided with a cylindrical hole 38c (Fig. 18) which could be fitted with a ring.

Additionally, the lever 43 is provided with a recess 50 (Fig. 18) fitted with a ring 42 and is further provided with a hole 39. The hole 39 of this lever permits the passage of the axis 38 for the second restoring lever which is placed symmetrically on the other side of the balance weight, as shown in Fig. 13. In effect, this figure shows that one of the restoring levers 43, the one at the bottom as viewed in the drawings, is articulated on the left cylindrical stay 38 while the restoring lever at the top in said figure is articulated on the right cylindrical stay 38. The hole 39 permits this last stay to pass. Likewise, the long holes 51 and 52 provided in the web 31 (Fig. 15) permit the passage of the two axes 38 when the member 36 rocks.

Figure 14:
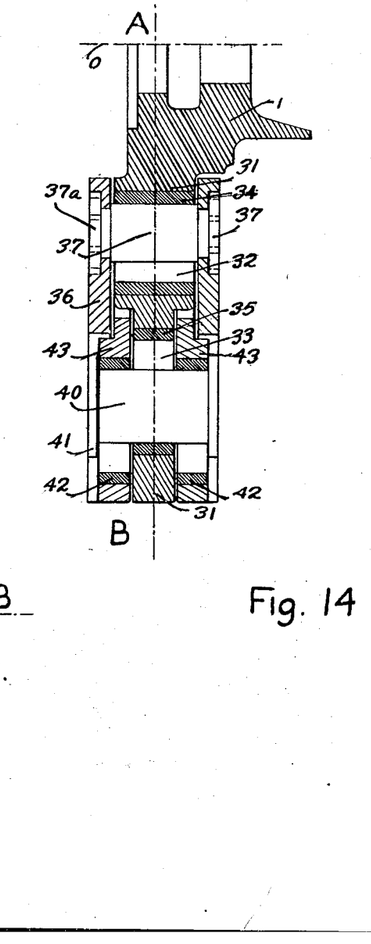
Fig. 14 is a section taken substantially on line C—D of Fig. 12.

As to the recess 50 (Fig. 18), the ring 42 transmits the restoring action to the rocking mass 36 through the intermediary of the roller 40, whereof the cheeks are 41 (Fig. 14).

The operation is as follows:

The mass 36 rocks about its mean position in a plane perpendicular to the axis of the shaft under the action of the disturbances and under the restoring action of the levers 43 of which, as it has been seen, the mass 36 carries the axes.

The action of levers 43 is as follows:

Each of them under the action of centrifugal forces exerts a pressure on the roller 40 and through the intermediary of said roller exerts a pressure on the wall of the recess 33, i. e., on the ring 35, carried by the web 31. Consequently, said web 31 exerts a reaction. This reaction of the web always tends to bring back to its mean position the structure constituted by the member 36 and the restoring levers 43 carried by the member 36.

The reactions due to the restoring levers give restoring torques which are added one to another and forces directed toward the axis O of the shaft which tend to move the mass 36 toward said axis. It results that the cylindrical stay 37 bears on the generatrix I (Fig. 15) with a force equal to the difference of this radial component due to the web and the centrifugal force exerted on the structure constituted by the member 36 and the restoring levers 43.

So, the oscillating member 36 rolls with direct rolling contact on the ring 34 to either side of the generatrix I.

Thus, the working is substantially the same as that in the case of the previous figures where the oscillating member is centered on the axis O of the rotary shaft 1, the only difference being that the oscillation around the generatrix I (or around generatrices quite close to the generatrix I) replaces the oscillations around the axis O. This operation is quite different from the operation of pendular systems.

The restoring torque thus obtained depends upon very varied factors, such as the positions and dimensions of the recesses, the relative values of the diameters of the rings and of the roller 40, the weight of the rocking mass 36, the radius of gyration of said mass, the weights of the restoring levers, and the position of the center of gravity of each of the restoring levers.

As a different embodiment, the restoring levers can rest on the web 31 in the opposite direction, the reaction of this web tending on the contrary to keep the movable structure away from the axis of the shaft 1. In this case, the cylinder 37 rocks while rolling around the generatrix J at the bottom of the ring 34 (Fig. 15), the working being substantially the same. This type of device, wherein the restoring levers are pivotally mounted on the rotating shaft rather than on the oscillating mass, is fully disclosed in my co-pending application Serial No. 333,561, filed May 6, 1940, for "Oscillations reducing device."

As a particular case, the axis I can coincide with the axis O. The centering of the oscillating member 36 on said axis can be achieved at it is shown in Figs. 1 to 3, or by any known process such as by using ball, roller or needle bearings or any rolling device.

For the purpose of compensating flexional or lateral oscillations, similar devices can be used wherein the oscillating member rocks not in a plane perpendicular to the axis of the shaft but in a plane of any orientation relatively to said axis, namely, in a plane containing said axis. An example of such a structure is illustrated in Figs. 9 and 10 of my above-mentioned prior filed co-pending application.

The previous devices can, in many cases, be tuned simultaneously on two or several harmonics. The described devices could be varied without exceeding the scope of the invention.

Having now particularly described and ascertained the nature of my said invention and in what manner the same operates, I declare that what I claim is:

1. In apparatus for reducing vibrations in a machine embodying a rotating member having a curved path or paths formed thereon, an oscillating member mounted on said rotating member for angular movement relative thereto, one or more centrifugal members pivotally mounted on the oscillating member, said member or members having curved surfaces thereon to form an arcuate path or paths, and force transmitting means having engagement with and movable along said arcuate path or paths and having engagement with said curved path or paths.

2. In apparatus for reducing vibrations in structures, a rotatable member having an arcuate path thereon, an oscillating member mounted on the rotating member for rotation thereby and angular movement relative thereto, the center of gravity of said oscillating member lying substantially in the axis of rotation of said rotating member, centrifugal restoring means movably mounted on said oscillating member, and means having rolling engagement with said arcuate path and said centrifugal means to transmit forces for restoring the oscillating member to its mean position.

3. A device for reducing vibrations of a moving part, comprising two elements including a mass and a member pivotally connected to said mass, said moving part and member having openings therein to form runways, and a rolling body of less diameter than either of said openings extending through said openings.

4. In apparatus of the class described comprising rotatable means, two elements including a mass and a member responsive to centrifugal forces pivotally connected to said mass, said rotatable means and member having guide surfaces thereon, and force transmitting means interposed between said guide surfaces, the latter and said force transmitting means being so formed that said mass will be yieldably urged toward a predetermined mean position relative to said rotatable means when said member is subjected to centrifugal forces during rotation of said rotatable means.

5. In apparatus of the class described, rotatable means, weight means mounted for oscillatory movement relative to said rotatable means, pivoted means mounted on said weight means, said pivoted means being responsive to centrifugal forces during rotation of said rotatable means, and force transmitting means interposed between surfaces on said rotatable means and said pivoted means, said surfaces and force transmitting means being so formed that said weight means will normally assume a predetermined mean position relative to said rotatable means when said pivoted means is subjected to centrifugal forces during the rotation of said rotatable means.

6. In apparatus of the class described, rotatable means, weight means supported by said rotatable means for oscillation relative thereto, means pivotally connected to said weight means, said rotatable means and said pivoted means each having a curved surface thereon, and a rollable body engageable by said surfaces when said pivoted means is subjected to centrifugal forces during rotation of said rotatable means, the radius of said body being appreciably less than the radius of curvature of either of said surfaces.

7. In apparatus of the class described, rotatable means, weight means supported by said rotatable means for oscillation relative thereto, centrifugally responsive pivoted means mounted on said weight means, said rotatable means and said pivoted means each having a curved surface thereon, and means movable along said surfaces and adapted to transmit centrifugally generated forces from said pivoted means to said rotatable means for yieldably resisting oscillation of said weight means.

8. In apparatus of the class described, rotatable means, weight means oscillatable relative to said rotatable means, pivoted means mounted on said weight means and responsive to centrifugal forces during rotation of said rotatable means, said pivoted means and said rotatable means each having a curved surface thereon, said surfaces being concave toward each other, and means engageable by and movable along said surfaces for transmitting forces from said pivoted means to said rotatable means.

9. In apparatus of the class described, rotatable means, weight means mounted for oscillation relative to said rotatable means, pivoted means responsive to centrifugal forces mounted on said weight means, and force transmitting means interposed between surfaces on said pivoted means and said rotatable means, at least one of said surfaces having a concave curvature, whereby said weight means are yieldably maintained in a predetermined mean position relative to said rotatable means during rotation of the latter.

10. In a device for reducing vibration in a structure embodying a rotating member having a laterally extending portion, an oscillating member mounted on said rotating member for rotation thereby and angular movement relative thereto, at least one centrifugal restoring member movably carried by said oscillating member, and means operatively connecting said restoring member and said laterally extending portion for restoring the oscillating member to a predetermined mean position relative to said rotating member during oscillation of the latter at substantially all normal operating speeds.

11. Apparatus for reducing vibrations in machines of the type embodying a rotating member comprising an oscillating member mounted on the rotating member for rotation thereby and for angular movement relative thereto, at least one centrifugal restoring member movably mounted on said oscillating member, and means operatively connecting said restoring member to said rotating member for transmitting a substantially uni-directional force from said restoring member to said rotating member for moving the oscillating member in opposite directions to a predetermined mean position relative to said rotating member.

12. In a device for reducing vibrations in a structure having a rotating member, an oscillating member mounted on the rotating member, said oscillating member being drivably connected only to said rotating member, the means connecting said members comprising centrifugal restoring means mounted on the oscillating member and means operatively connecting said restoring means and rotating member for restoring the oscillating member to a predetermined mean position relative to said rotating member at substantially all normal operating speeds of the latter.

13. In a device for reducing vibrations in a structure having a rotating member, an oscillating member mounted on said rotating member, centrifugal restoring means mounted on the oscillating member, and means including a roller operatively connecting said restoring means and the rotating member for moving the oscillating member to a mean position, said connecting means permitting substantially frictionless movement of said restoring means relative to said rotating member.

14. In apparatus of the class described, rotatable means, weight means mounted for oscillatory movement relative to said rotatable means, centrifugally actuated means movably carried by said weight means, and means operatively connecting said centrifugally actuated means and said rotatable means for rendering the centrifugal force of said centrifugally actuated means effective to apply a continuous substantially radially directed force to said rotatable means for moving said weight means in opposite directions toward a predetermined mean position relative to said rotatable means.

15. In apparatus for reducing vibrations in a structure, rotatable means, and weight means mounted for oscillatory movement relative to said rotatable means and being drivably connected only to said rotatable means, the connecting means therefor comprising centrifugally actuated means movably carried by said weight means and means operatively connecting said centrifugally actuated means and said rotatable means for rendering the centrifugal force of said centrifugally actuated means effective to yieldably resist movement of said weight means in either direction from a predetermined mean position relative to said rotatable means.

16. In apparatus of the class described, rotatable means, weight means mounted for oscillatory movement relative to said rotatable means, said weight means having a predetermined mean position relative to said rotatable means, and at least one restoring means articulately mounted on said weight means and operatively so connected with said rotatable means that centrifugal forces acting on said restoring means tend to move said weight means in either direction toward said mean position, the mounting and connection of said restoring means being such that the center of gravity thereof is outside the plane containing the axis of rotation of said rotatable means and the pivotal axis of said restoring means when said weight means is in said mean position.

17. In apparatus of the class described, rotatable means, weight means mounted for oscillation relative to said rotatable means, and pivoted means mounted on said weight means, said pivoted means being operatively connected with said rotatable means to be rotated thereby and being responsive to centrifugal forces during rotation of said rotatable means for exerting a force on said rotatable means directed substantially radially away from the axis of rotation of said rotatable means and tending to maintain said weight means in a predetermined mean position relative to said rotatable means.

18. In apparatus of the class described, rotatable means, weight means mounted for oscillation relative to said rotatable means, and pivoted means mounted on said weight means, said pivoted means being operatively connected with said rotatable means to be rotated thereby and being responsive to centrifugal forces during rotation of said rotatable means for exerting a force on said rotatable means directed substantially radially toward the axis of rotation of said rotatable means and tending to maintain said weight means in a predetermined mean position relative to said rotatable means.

FRANÇOIS MARIE
    MICHEL BERNARD SALOMON.